Aug. 14, 1934.  T. B. COLLINS  1,970,077
MEANS OF SEPARATING AND COLLECTING DUST PARTICLES AND LIQUID GLOBULES
Filed July 7, 1933  4 Sheets-Sheet 1

T. B. Collins
INVENTOR
By: Marks & Clerk Attys

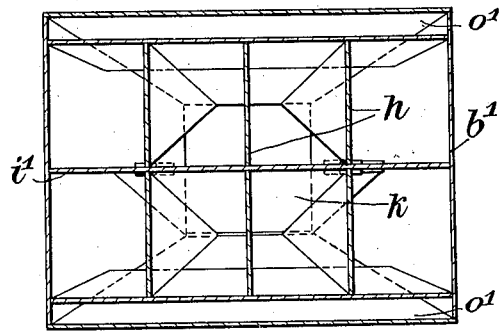
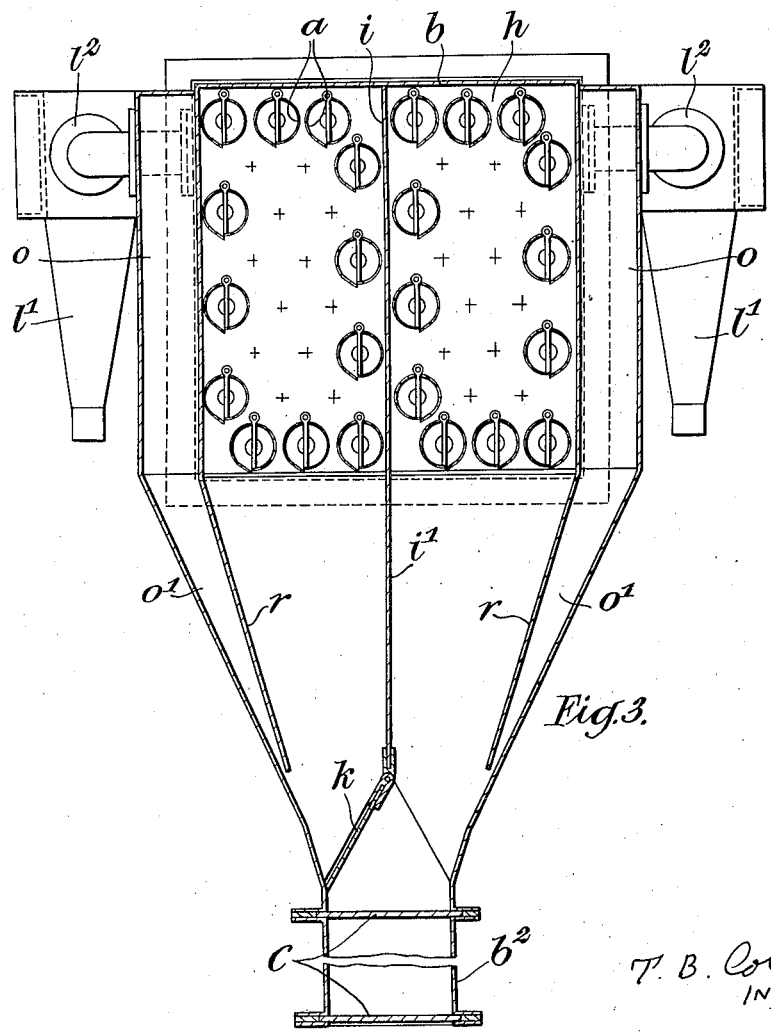

Aug. 14, 1934.  T. B. COLLINS  1,970,077
MEANS OF SEPARATING AND COLLECTING DUST PARTICLES AND LIQUID GLOBULES
Filed July 7, 1933  4 Sheets-Sheet 4

T. B. Collins
INVENTOR
By: Marks & Clerk
Attys.

Patented Aug. 14, 1934

1,970,077

UNITED STATES PATENT OFFICE 1,970,077

MEANS OF SEPARATING AND COLLECTING DUST PARTICLES AND LIQUID GLOBULES

Thomas Bosanko Collins, Strathbungo, Glasgow, Scotland

Application July 7, 1933, Serial No. 679,446
In Great Britain July 30, 1932

6 Claims. (Cl. 183—30)

This invention relates to improved means of separating and collecting dust particles and/or globules of liquid from gaseous fluids in which they are suspended.

Referring to the accompanying drawings, which illustrate one form of carrying the invention into effect by way of example, Fig. 1 is an elevation, partly in section, Fig. 2 a sectional plan along the line A—A¹ in Fig. 1, Fig. 3 a transverse section along the line B—B¹ in Fig. 1, and Fig. 4 a sectional plan along the line C—C¹ in Fig. 1.

Figure 5:
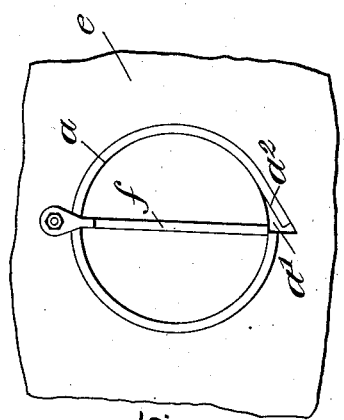
Fig. 5 shows an end view of the tube and twisted strip inserted therein.
Figure 6:
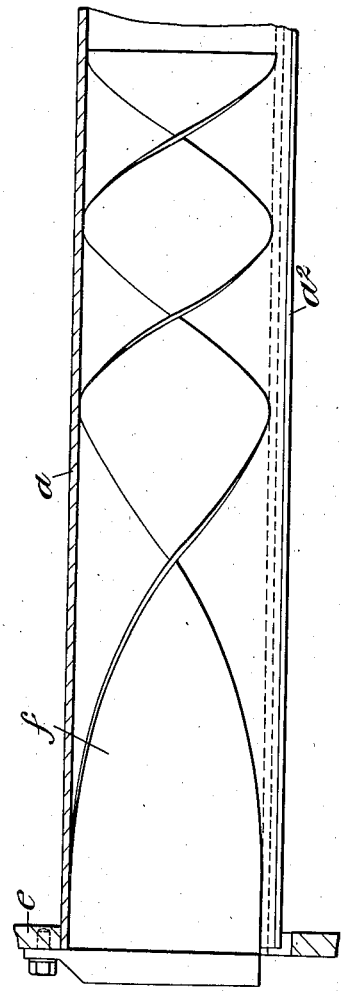
Fig. 6 shows the tube and the transverse strip inserted therein in sectional elevation, whilst

Referring to the drawings, $a$ are the tubes which are inserted in the upper part of a collecting casing $b$, the lower part $b^1$ of which is tapered, ending in a conduit $b^2$ of rectangular cross-section provided with dampers $c$. This unit serving for the separation and collection of the dust or liquid globules is inserted in a conduit $d$, the tubes $a$ being held in position within the casing $b$ by means of two end plates $e$ where the tubes remain in open communication with the conduit $d$ through which the gaseous fluid containing the particles to be separated is intended to flow. Each one of the tubes $a$ (see Figs. 5 and 6) is formed with a slot $a^1$ which is preferably obtained by cutting the tube at its lower side in a longitudinal direction and pressing out one of the edges so that the end $a_2$ is tangential to the circular portion $a$. Within each tube there is provided a twisted strip $f$ of thin material which is inserted into the tube at the inlet end thereof, where it is suitably secured to the end plate $e$ in such a manner that it cannot be rotated by the reaction of the whirling fluid on it nor be pushed into the tube away from the inlet end thereof. This thin strip of material may extend throughout the whole length of the tube $a$ or only along a small portion thereof, its pitch preferably varying along the length of the tube, as can be seen from Fig. 6.

Figure 1:
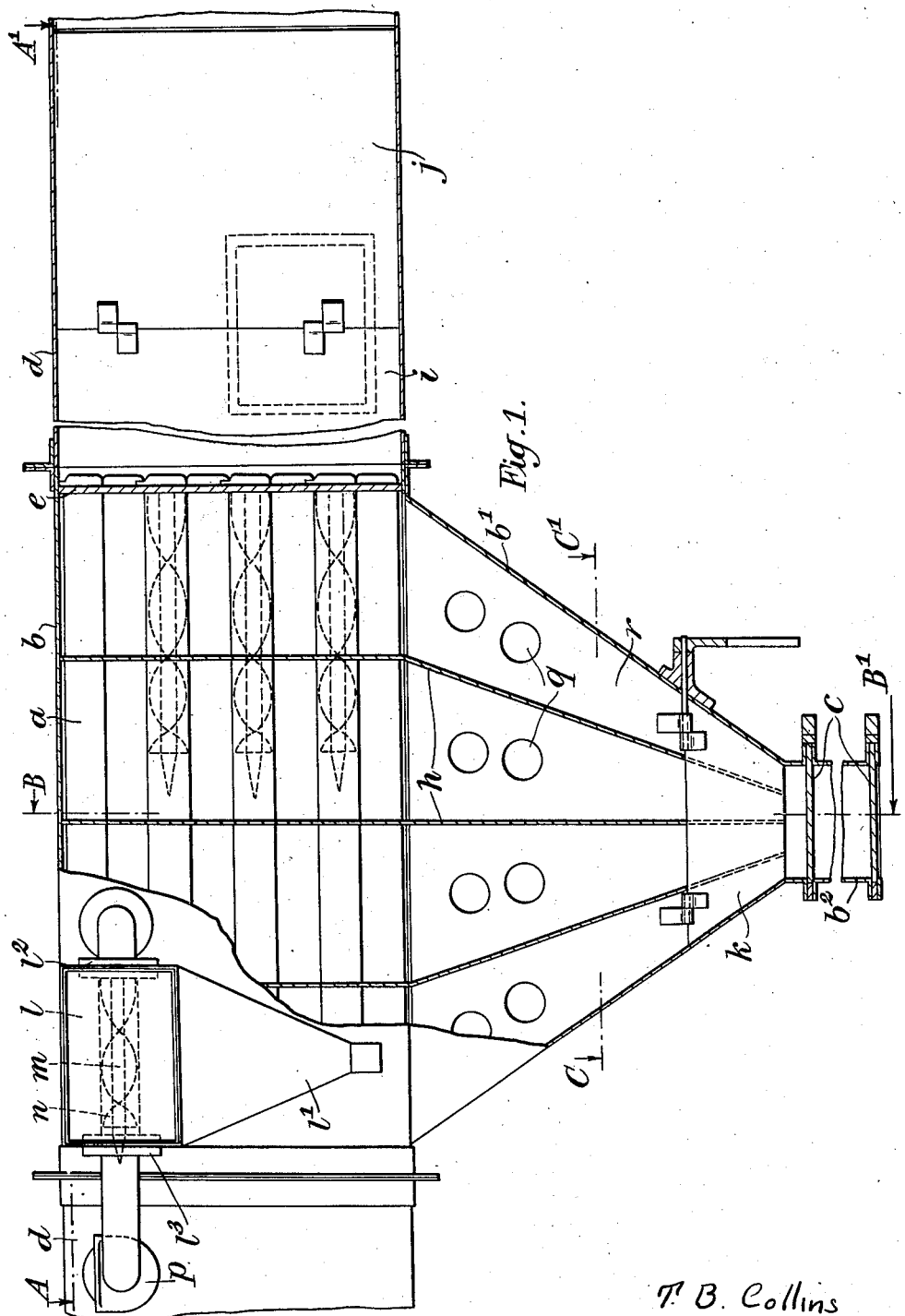
Figure 2:
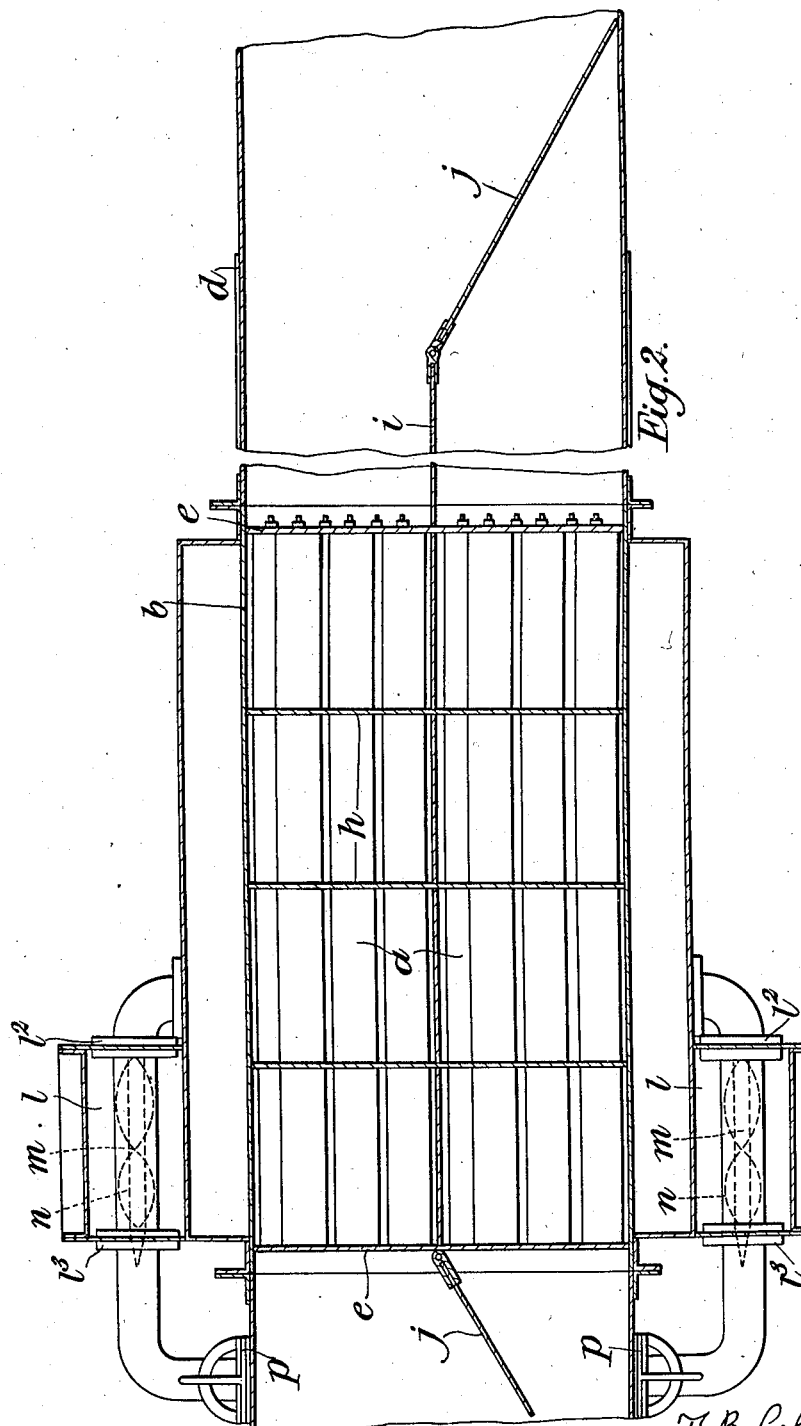
Figure 7:
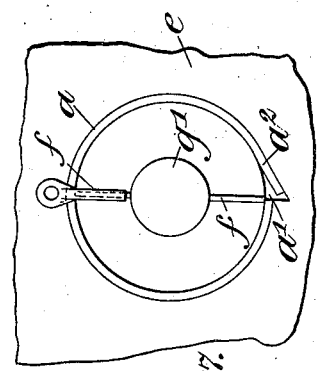
Figs. 7 and 8 illustrate corresponding views of a modified form of construction of twisted strip inserted in the tube.
Figure 8:
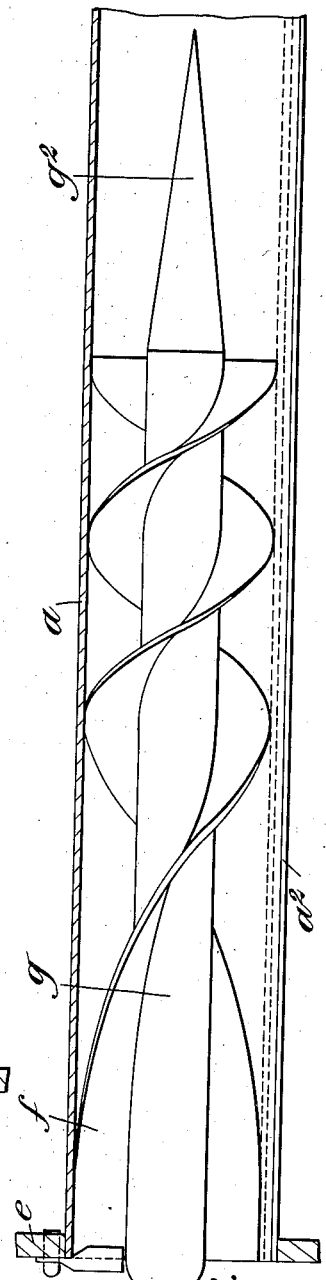

According to the modification illustrated in Figs. 7 and 8, the strip $f$ of thin material is attached to a central core $g$, two strips being preferably employed which run radially along two diametrically opposite points of the central core $g$. The main body of the core is a cylinder terminating at its upstream end $g^1$ in a rounded boss shaped to the form of a hyperboloid and at its downstream end $g^2$ in a core of gradual taper. As referred to in connection with the form of construction illustrated in Figs. 5 and 6, this deflecting member may be made of any length and it is to be understood that also the number of the strips $f$ attached to the central core $g$ may also be varied.

In both forms of construction the strips $f$ follow sinuous curves in the longitudinal direction of the tubes in which they are inserted. Instead of one end $a_2$ at the edge of the slot $a^1$ being made tangential to the circular portion, the other edge of the slot $a_1$ may also be so made.

The tubes $a$ are arranged with their axes running in the direction of flow of the gaseous fluid, which, whilst passing through the tubes is caused by the twisted strips $f$ to follow a curved path, centrifugal force being imparted to the relatively dense particles of dust or liquid globules, which causes them to be thrown to the inner circumference of the tubes and thence pass through the longitudinal slots into the casing $b$ containing the nest of tubes and therefrom into the tapered portion $b^1$ of the casing, where the said dust particles and liquid globules are collected, being removed when desired by opening the dampers $c$ provided in the conduit $b^2$.

In order to reduce eddying within the casing $b$ and its extension $b^1$ to a minimum, the said casing with its extension is subdivided by means of intermediate transverse plates $h$. The nest of tubes $a$ is preferably subdivided into the two groups in the longitudinal direction of the unit by means of a wall $i$, means being provided in the conduit $d$ for closing the passage of the gaseous fluid through one section of the unit when the same requires to be cleaned. The said means preferably consist of flap valves $j$ adapted to be rocked in the one or the other direction for the purpose of obstructing the passage of the gaseous fluid through the one or the other half of the unit. Similarly the tapered extension $b^1$ of the casing $b$ is provided with an extension $i^1$ of the said longitudinal wall $i$ for the purpose of being divided into two parts, its lower end being provided with a flap valve $k$ which can be rocked in the one or the other direction to close up the one or the other section of the unit.

A small supplementary collector $l$ is provided in the low pressure side of the unit, which collector is preferably provided with a slotted tube $m$ containing a twisted strip $n$ both constructed in the manner hereinbefore referred to in connection with the main collecting casing b. The supplementary collector is also provided with a tapered extension l¹ for the collection of the dust particles or liquid globules. Although two such supplementary collectors have been shown on the drawings, it is to be understood that only one supplementary collector may be attached to the main collecting casing and although only one tube has been shown within the collector l, it is to be understood that a number of such tubes may be accommodated therein. The outlet from the supplementary collector, instead of being connected directly to the low pressure side of the main collector, may be connected to some other region of lower pressure remote from the main unit, such as a fan suction, when gases are the medium dealt with, or to a condenser, when steam is the medium.

In the construction illustrated in the drawings, side chambers o have been formed on the main collecting casing, said side chambers extending downwards into the tapered portion b¹ as indicated at o¹ and communicating with one end l² of the supplementary collector l, the other end l³ of which communicates with the low pressure side of the unit, a valve p being preferably provided to open, close or throttle this communication. The object of the provision of the side chambers is to permit the air or gas which enters the collector along with the dust and liquid globules to escape. The air or gas which passes through the slots in the tubes into the main collecting chamber flows therefrom into the side chambers o¹ and from the latter into the supplementary collector l. q are pressure equalizing holes which are provided in the walls r between the collecting chambers underneath the nest of tubes and the extension o¹ of the side chambers.

The unit hereinbefore described may be inserted in a conduit carrying any gaseous medium, such as air, gas or steam, serving in the latter case as a steam separator collecting the globules of liquid.

The flap valve j hereinbefore referred to may also be used for maintaining the speed of flow through the tubes, when the unit has to deal with less volume of gaseous fluid than the maximum for which the unit has been designed, it being understood that instead of the flap valves j being used for this purpose, other valve arrangements may be provided instead.

I wish it to be understood that the details for carrying the invention into effect may be modified in various respects without in any way departing from the scope of the invention as claimed in the appended claims.

What I claim is:

1. Means of separating and collecting dust particles and/or liquid globules from gaseous fluids comprising a main collecting chamber, consisting of a casing, a nest of open-ended tubes within the said casing, end plates forming part of the said casing and between which the open-ended tubes are set, each of the tubes having a longitudinal slot extending along its length, a deflecting surface within each tube adapted to cause or assist the dust and/or liquid globules to be separated from the gaseous fluid and be guided towards the said slot, said casing having a lower extension in which the dust and/or liquid globules are collected, in combination with a small supplementary collector and with means of communication between the said main collecting casing and small supplementary collector, whereby the gases which have escaped with dust and/or liquid globules through the said longitudinal slots in the tubes are caused to escape from the said casing and any dust and/or liquid globules which may have been carried away by the said gases without their being deposited in the said lower extension are caused to be deposited in the said supplementary collector.

2. Means of separating and collecting dust particles and/or liquid globules from gaseous fluids as claimed in claim 1 in which the small supplementary collector is also connected to the lower pressure side of the unit.

3. Means of separating and collecting dust particles and/or liquid globules from gaseous fluids as claimed in claim 1 in which the small supplementary collector is connected to the lower pressure side of the unit, and the said supplementary collector has a slotted tube containing a twisted strip acting as a deflecting surface.

4. Means of separating and collecting dust particles and/or liquid globules from gaseous fluids as claimed in claim 1 and in which the small supplementary collector is provided on the low pressure side of the unit, and has a lower tapered extension in which the dust and/or liquid globules are collected.

5. Means of separating and collecting dust particles and/or liquid globules from gaseous fluids as claimed in claim 1 and in which the means of communication between the main collecting casing and small collector consists of a side chamber provided on the main collecting casing.

6. Means of separating and collecting dust particles and/or liquid globules from gaseous fluids as claimed in claim 1 and in which the means of communication between the main collecting casing and small collector consists of a side chamber provided on the main collecting casing and of pressure equalizing holes between the main collecting casing and the said side chamber.

THOMAS BOSANKO COLLINS.